United States Patent
Speijer et al.

(10) Patent No.: US 11,333,632 B2
(45) Date of Patent: May 17, 2022

(54) APPARATUS AND A METHOD FOR ULTRASONIC INSPECTION OF MULTI-LAYERED STRUCTURES

(71) Applicant: FOKKER AEROSTRUCTURES B.V., Papendrecht (NL)

(72) Inventors: Jaap Louis Speijer, Papendrecht (NL); Jeroen Jozef Gerardus Ignatius Rutten, Papendrecht (NL)

(73) Assignee: FOKKER AEROSTRUCTURES B.V., Papendrecht (NL)

( * ) Notice: Subject to any disclaimer, the term of this patent is extended or adjusted under 35 U.S.C. 154(b) by 272 days.

(21) Appl. No.: 16/606,527

(22) PCT Filed: Apr. 20, 2018

(86) PCT No.: PCT/NL2018/050253
§ 371 (c)(1),
(2) Date: Oct. 18, 2019

(87) PCT Pub. No.: WO2018/199744
PCT Pub. Date: Nov. 1, 2018

(65) Prior Publication Data
US 2020/0150090 A1    May 14, 2020

(30) Foreign Application Priority Data
Apr. 28, 2017  (NL) .................................... 2018810

(51) Int. Cl.
*G01N 29/22*  (2006.01)
*G01N 29/24*  (2006.01)
(Continued)

(52) U.S. Cl.
CPC ......... *G01N 29/043* (2013.01); *G01N 29/221* (2013.01); *G01N 29/223* (2013.01);
(Continued)

(58) Field of Classification Search
CPC .. G01N 29/043; G01N 29/223; G01N 29/225; G01N 29/28; G01N 29/2487;
(Continued)

(56) References Cited

U.S. PATENT DOCUMENTS 4,807,476 A * 2/1989 Cook ................. G01N 29/0645
                                                      73/620
5,373,543 A * 12/1994 Ackermann ........... A61B 6/032
                                                      378/20
(Continued)

FOREIGN PATENT DOCUMENTS

EP      1336842 A2    8/2003
JP      H0440360 A    2/1992

OTHER PUBLICATIONS

International Search Report, dated Jun. 27, 2018, from corresponding PCT application No. PCT/NL2018/050253.

*Primary Examiner* — Jacques M Saint Surin
(74) *Attorney, Agent, or Firm* — Nixon & Vanderhye

(57) ABSTRACT

Disclosed is an apparatus for ultrasonic inspection of a multi-layered, ML, plate with a stiffener attached on a first surface of the ML plate. The apparatus includes a transmitter directing a first ultrasonic beam along a first guiding medium to the ML plate, along a first axis at an angle to the first surface, the first axis being within a transmission angle with respect to a first normal perpendicular to the first surface, and a receiver for receiving a transmitted ultrasonic beam originating from the first beam after passing through the ML plate along a second axis of a second guiding medium for directing the transmitted beam. The apparatus is configured for setting the transmission angle of the first axis of the first beam to let the second axis pass through a location beneath the stiffener beneath the first surface to which the stiffener is attached.

19 Claims, 3 Drawing Sheets

(51) Int. Cl.
*G01N 29/28* (2006.01)
*G01N 29/04* (2006.01)

(52) U.S. Cl.
CPC ....... *G01N 29/225* (2013.01); *G01N 29/2487* (2013.01); *G01N 29/28* (2013.01); *G01N 2291/0231* (2013.01); *G01N 2291/0289* (2013.01); *G01N 2291/048* (2013.01); *G01N 2291/102* (2013.01)

(58) Field of Classification Search
CPC ..... G01N 2291/102; G01N 2291/0231; G01N 2291/0289; G01N 29/221; G01N 2291/048; G01N 2291/056
USPC .......................................................... 73/588
See application file for complete search history.

(56) References Cited

U.S. PATENT DOCUMENTS

| | | | |
|---|---|---|---|
| 5,567,535 A * | 10/1996 | Pettit | B64C 1/12 428/608 |
| 5,698,787 A * | 12/1997 | Parzuchowski | G01N 29/2418 73/583 |
| 10,792,893 B2 * | 10/2020 | Gunnink | B32B 3/02 |
| 2005/0268720 A1 * | 12/2005 | Quarry | G01N 29/262 73/627 |
| 2006/0201252 A1 | 9/2006 | Georgeson et al. | |
| 2012/0183408 A1 * | 7/2012 | Noerlem | B29C 70/023 416/229 R |
| 2017/0059531 A1 * | 3/2017 | Fetzer | G01N 29/265 |

* cited by examiner

APPARATUS AND A METHOD FOR ULTRASONIC INSPECTION OF MULTI-LAYERED STRUCTURES

FIELD OF THE INVENTION

The invention relates to an apparatus and a method for ultrasonic inspection of multi-layered structures, in particular for the detection of defects in such structures.

BACKGROUND OF THE INVENTION

Fibre Metal Laminate (FML) structures are multi-layered structures that are often used in aviation. For instance FML aircraft structures are used for aircraft fuselage skins. Since FML aircraft structures comprising various structural elements (e.g. fuselage skin with external doublers and stiffeners) are more and more manufactured in one single autoclave cure cycle, as a consequence the inspection of the quality of the FML aircraft structures becomes more complex and requires that defects need to be detected in thicker and/or more complicated structures.

Large FML aircraft structures are normally inspected with an automated ultrasonic squirter through-transmission technique applying an ultrasonic beam in a water jet perpendicular to the surface to be inspected.

FIG. 1 schematically shows a side view of a FML structure 100 that is inspected by an apparatus using an ultrasonic transmission technique according to prior art. A transmitter 110 transmits first ultrasonic beam 120 along a first ultrasonic beam guiding medium 121 to the FML structure 100. The apparatus comprises a first nozzle 111 that generates a first water jet 121 guiding the first ultrasonic beam 120. In other words, the first ultrasonic beam 120 is guided into the FML structure 100 by means of the first water jet 121 as the ultrasonic beam guiding medium squirting on a first surface 101 of the FML structure 100. The apparatus further comprises a receiver 130 that receives a second ultrasonic beam 140 originating from the first ultrasonic beam 120 after passing through the FML structure 100 along a second ultrasonic beam guiding medium 141. The apparatus further comprises a second nozzle 131 that generates a second water jet as the second beam 141 guiding the second ultrasonic beam 140 at the opposite side of the structure 100. The transmitter 110 and the receiver 130 can be a single element or multi elements ultrasonic transducer. The first ultrasonic water jet 121 guiding the first ultrasonic beam 120 has a first axis 122 that is perpendicular to the first surface 101 of the FML structure 100. The second water jet 141 guiding the second ultrasonic beam 140 has a second axis 142 that is perpendicular to the first surface 101 of the FML structure 100. The second axis 142 is in line with the first axis 122.

The FML structure 100 is inspected for defects by moving the transmitter 110 and the receiver 130 over the FML structure 100. When the inspected area of the FML structure 100 has no defects, a signal analyser (not shown in FIG. 1) of the ultrasonic transmission technique may give signals with certain characteristics 160. When the inspected area of the FML structure 100 has a defect 150, the signal analyser of the ultrasonic transmission technique might give signals with other characteristics 170. The characteristics of signals 170 corresponding to the defect 150 can be different from the characteristics of signals 160 without the defect 150. The characteristics of signals 160 and 170 comprise signal amplitude, magnitude, phase, noise level etc. Based on the characteristics of the signals 160, 170, the defect 150 can be identified.

FIG. 2 schematically shows a side view of a FML structure 200 that is inspected by an apparatus using an ultrasonic transmission technique according to prior art. A stringer 210 is attached on a first surface 220 of the FML structure 200. The stringer 210 may have a Z-shaped cross-sectional profile. The stringer 210 comprises a stringer foot 230, a web plate 240, and a stringer hat 250.

A drawback of the conventional inspection technique shown in FIG. 1 is that an area 260 below the stringer hat 250 cannot be inspected with the conventional inspection technique, since the stringer hat 250 would block the ultrasonic beam 270 guided by a water jet 271. Thus a defect 280 in the area 260 cannot be detected using the conventional technique.

An automated ultrasonic pulse echo technique, commonly used for the inspection of fibre reinforced composite aircraft structures could be applied to the inspection of the FML structure. However, ultrasonic pulse echo techniques are not suitable for the inspection of the FML structure in a manufacturing environment. The reason for this lies in the typical ultrasonic signal behaviour involved with passing through a multi-layered structure. Such a multi-layered structure has natural layer thickness variations well within structural design tolerances. However, these minor variations in the individual layers may lead to large variations in the received signal, causing uncontrollable constructive and destructive interference behaviour.

The object of the invention therefore is to provide an apparatus and a method for enhancing the possibility of detecting defects in a multi-layered structure under obstacles such as given in FIG. 2.

SUMMARY OF THE INVENTION

According to a first aspect, the invention provides an apparatus for ultrasonic inspection of a multi-layered structure with a stiffener with a foot attached on a first surface of the multi-layered structure, the apparatus comprising a transmitter arranged to direct a first ultrasonic beam along a first ultrasonic beam guiding medium to the multi-layered structure along a first axis which is at an angle to the first surface, said first axis being within a defined transmission angle with respect to a first normal which is perpendicular to the first surface of the ML plate structure, and a receiver for receiving a transmitted ultrasonic beam originating from the first ultrasonic beam after passing through the multi-layered structure along a second axis of a second ultrasonic beam guiding medium for directing the transmitted ultrasonic beam, the apparatus being configured for setting the transmission angle of the first axis of the first ultrasonic beam to a value such that the second axis passes through a location beneath the stiffener below the first surface to which said stiffener is attached.

Advantageously, by applying the invention, a defect underneath a web plate and a defect underneath the hat of the stringer on the multi-layered structure can be detected.

In an embodiment, the second axis under a reception angle within an angular range around a central orientation perpendicular to a second surface of the ML plate structure opposite to the first surface.

According to another aspect, the invention provides a method for ultrasonic inspection of a multi-layered, ML, plate structure comprising a stiffener with a foot attached to a first surface of the ML plate structure, the method comprising: providing an ultrasonic beam from a transmitter; directing the ultrasonic beam along a first axis of first ultrasonic beam guiding medium guiding the first ultrasonic beam at the foot under a transmission angle; transmitting the ultrasonic beam through the foot and the ML plate structure to a second surface of the ML plate structure parallel to the first surface; wherein the transmission angle of the ultrasonic beam is set to a value such that the second axis passes through a location beneath the stiffener below the first surface to which said stiffener is attached.

In an embodiment, the method further comprises receiving the transmitted ultrasonic beam, transmitted through the foot and the ML plate structure and propagating from the second surface along a second axis of a second ultrasonic beam guiding medium, by an ultrasonic receiver under a reception angle, with the reception angle within an angular range around a central orientation that is perpendicular to the second surface.

Further embodiments are disclosed in the attached claims.

BRIEF DESCRIPTION OF THE FIGURES

Embodiments of the present invention will be described hereinafter, by way of example only, with reference to the accompanying drawings which are schematic in nature and therefore not necessarily drawn to scale. Furthermore, like reference signs in the drawings relate to like elements.

DETAILED DESCRIPTION

Figure 3:
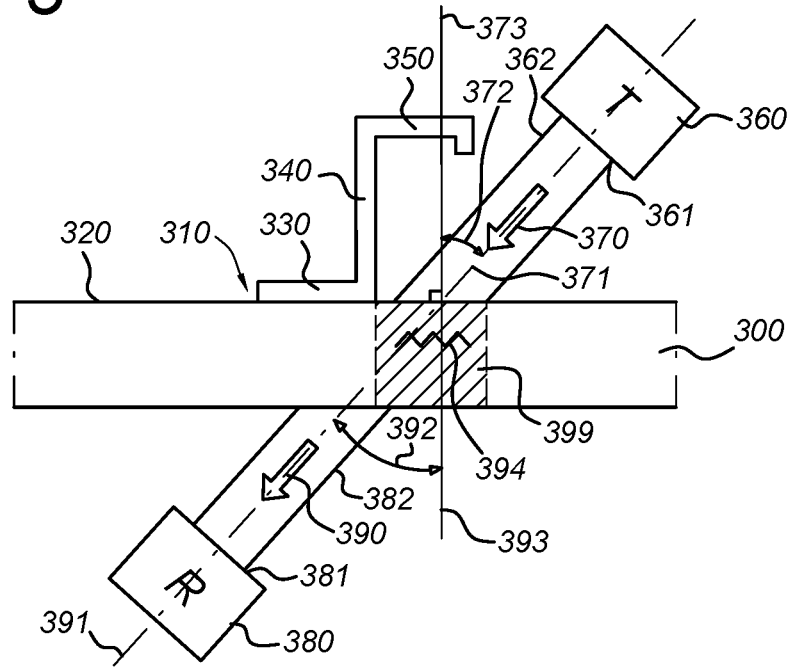
FIG. 3 schematically shows a side view of a FML structure that is inspected by an apparatus according to an embodiment of the present invention.

FIG. 3 schematically shows a side view of a multi-layered structure 300 that is inspected by an apparatus according to an embodiment of the present disclosure. The multi-layered structure 300 can be a Fibre Metal Laminate structure (FML) or a bonded metal sheet-sheet structure. The FML structure 300 is inspected by an ultrasonic through-transmission technique. A stringer 310 is attached on, for example adhesively bonded to, a first surface 320 of the FML structure 300. That is, the stringer 310 can be adhesively bonded to the first surface 320. The stringer 310 may have a Z-shaped cross-sectional profile or another profile as disclosed further on. The stringer 310 comprises a stringer foot 330, a web plate 340, and a stringer hat 350.

The apparatus for the ultrasonic inspection of the FML structure 300 comprises a transmitter 360 for transmitting a first ultrasonic beam 370 along a first ultrasonic beam guiding medium 362 to the FML structure 300 and a receiver 380 for receiving a second ultrasonic beam 390 along a second ultrasonic beam guiding medium 382 originating from the first ultrasonic beam 370 after passing through the FML structure 300.

The first ultrasonic beam 370 has a first axis 371 non-perpendicular to the first surface 320 under a first angle 372 with respect to a first normal 373 of the first surface 320 of the FML structure 300.

The second ultrasonic beam 390 along a second guiding medium 382 has a second axis 391 under a second angle 392 with respect to a second normal 393 of the first surface 320 of the FML structure 300, wherein the second normal 393 is opposite to the first normal 373.

The ultrasonic beam guiding media 362, 382 are a fluid which may be water. The first guiding medium 362 and the second guiding medium 382 may be the same guiding medium or two different guiding media.

According to an embodiment of the present disclosure, the apparatus further comprises a first nozzle 361 that generates a first water jet 362 guiding the first ultrasonic beam 370 under the first angle 372 with respect to the first normal 373. In other words, the first ultrasonic beam 370 is guided into the FML structure 300 by means of the first water jet 362 squirting on the first surface 320 of the FML structure 300. The apparatus comprises a second nozzle 381 that generates a second water jet 382 guiding the second ultrasonic beam 390 under the second angle 392 with respect to the second normal 393. The transmitter 360 and the receiver 380 can be an ultrasonic transducer.

According to an embodiment of the present disclosure, the first angle 372 is equal to the second angle 392 and the first axis 371 is in line with the second axis 391.

According to an embodiment of the present disclosure, the first angle 372 and the second angle 392 is set in such a way that the first axis 371 of the first beam 362 does not cross the stringer 310, when the first axis 371 intersects with a defect 394. This configuration enables the detection of the defect 394 in an area 396 below the stringer hat 350 that cannot be detected using the conventional technique described in the corresponding text of FIG. 2. According to an embodiment of the present disclosure, the first axis does not cross the stringer hat 350 when the first axis 371 intersects with the defect 394.

According to an embodiment of the present disclosure, instead of using nozzles, the setup can also be immersed in an ultrasonic beam guiding medium that can be water.

Figure 4:
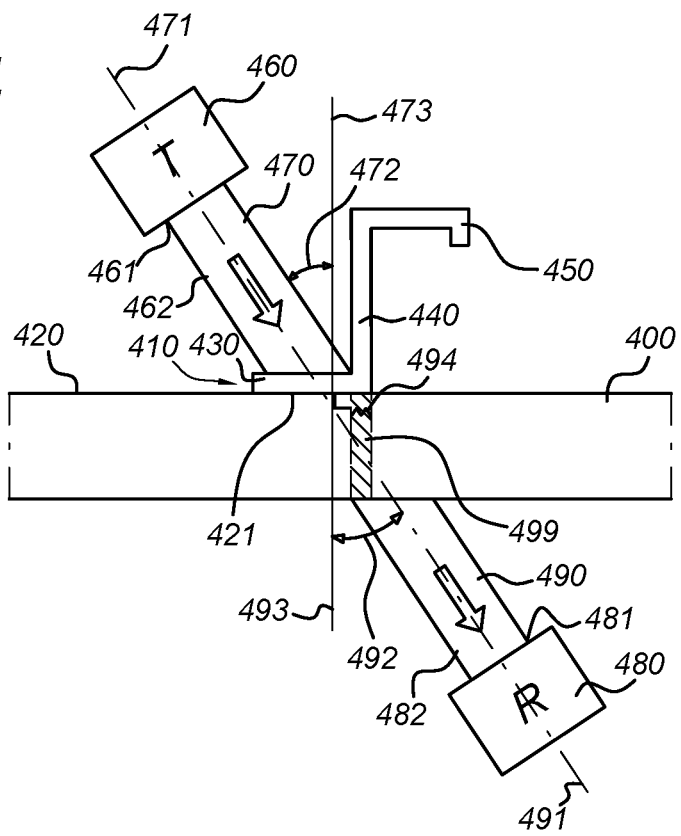
FIG. 4 schematically shows a side view of a FML structure that is inspected by an apparatus according to an embodiment of the present invention.

FIG. 4 schematically shows a side view of a FML structure 400 that is inspected by an apparatus according to an embodiment of the present disclosure. The FML structure 400 is inspected by an ultrasonic through-transmission technique. The FML structure 400 is similar to the FML structure 300. A stringer 410 is attached on a first surface 420 of the FML structure 400. The stringer 410 may have a Z-shaped cross-sectional profile or another profile as disclosed further on. The stringer 410 comprises a stringer foot 430, a web plate 440, and a stringer hat 450.

Similar to FIG. 3, the apparatus for the ultrasonic inspection of the FML structure 400 comprises a transmitter 460 for transmitting a first ultrasonic beam 470 along a first ultrasonic beam guiding medium 462 to the FML structure 400 and a receiver 480 for receiving a second ultrasonic beam 490 originating from the first ultrasonic beam 470 after passing through the FML structure 400.

The first ultrasonic beam 470 has a first axis 471 non-perpendicular to the first surface 320 under a first angle 472 with respect to a first normal 473 of the first surface 420 of the FML structure 400.

The second ultrasonic beam 490 along a second guiding medium 482 has a second axis 491 under a second angle 492 with respect to a second normal 493 of the first surface 420 of the FML structure 400, wherein the second normal 493 is opposite to the first normal 473.

The ultrasonic beam guiding media 462, 482 are a fluid which may be water. The first guiding medium 462 and the second guiding medium 482 may be the same guiding medium or two different guiding media.

According to an embodiment of the present disclosure, the apparatus further comprises a first nozzle 461 that generates a first water jet as the first ultrasonic beam guiding medium 462 guiding the first ultrasonic beam 470 under the first angle 472 with respect to the first normal 473. In other words, the first ultrasonic beam 470 is guided into the FML structure 400 by means of the first water jet 462 squirting towards the first surface 420 of the FML structure 400. The apparatus comprises a second nozzle 481 that generates a second water jet as the second ultrasonic beam guiding medium 482 guiding the second ultrasonic beam 490 under the second angle 492 with respect to the second normal 493. The transmitter 460 and the receiver 480 can be an ultrasonic transducer.

According to an embodiment of the present disclosure, the first angle 472 is equal to the second angle 492 and the first axis 471 is in line with the second axis 491.

According to an embodiment of the present disclosure, the first angle 472 is set in such a way that the first axis 471 of the first beam 462 crosses a first area 421 where the stringer 410 is attached to the first surface 420 of the FML structure 400, This configuration may enable the detection of a defect 494 directly below the stringer web plate 440 that cannot be detected using the conventional technique described in the corresponding text of FIG. 2.

According to an embodiment of the present invention, instead of using nozzles, the apparatus can also be immersed in an ultrasonic beam guiding medium that can be water.

Figure 5:
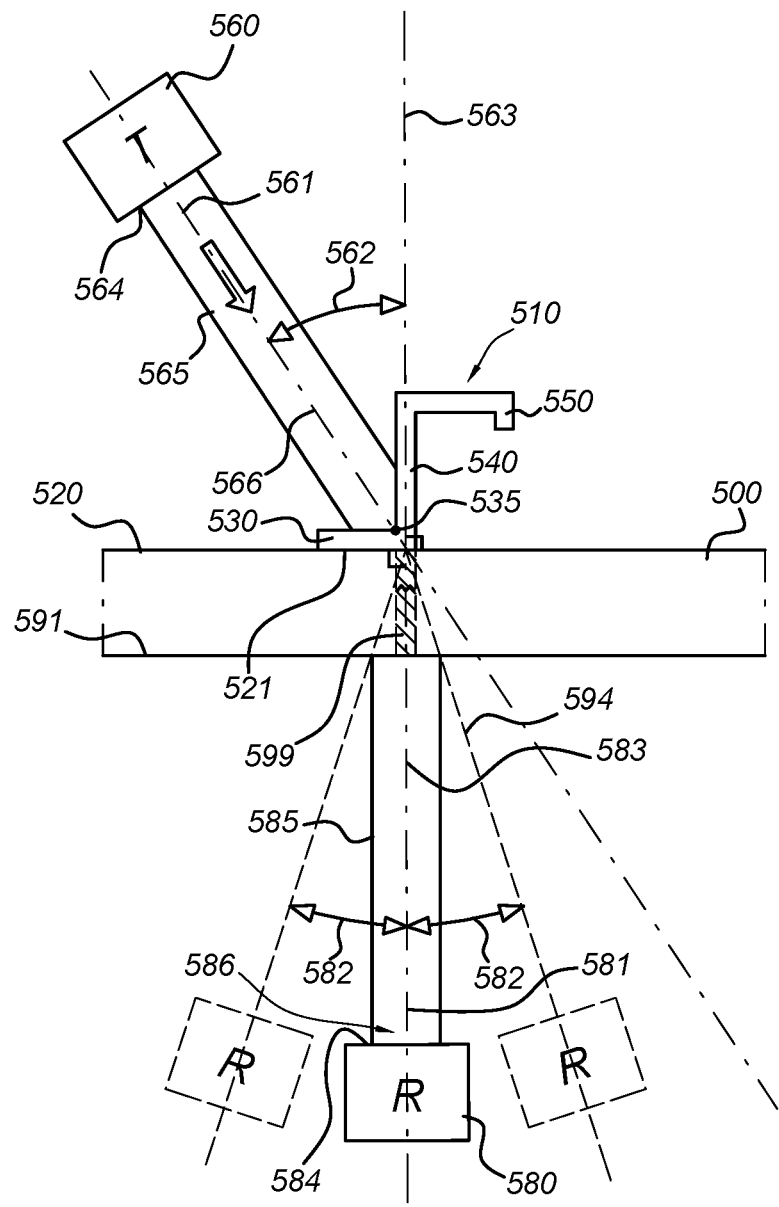
FIG. 5 schematically shows a side view of a FML structure that is inspected by an apparatus according to an embodiment of the present invention.

FIG. 5 schematically shows a side view of a FML structure 500 that is inspected by an apparatus according to an embodiment of the present disclosure. The FML structure 500 is inspected by an ultrasonic transmission technique. The FML structure 500 is similar to the FML structure 300 and the FML structure 400. A stringer 510 is attached on a first surface 520 of the FML structure 500. The stringer 510 may have a Z-shaped cross-sectional profile or another profile as disclosed further on. The stringer 510 comprises a stringer foot 530, a web plate 540, and a stringer hat 550.

This configuration allows the detection of a defect 594 below the web plate 540 that cannot be detected using the conventional technique described in the corresponding text of FIG. 2.

Similar to FIGS. 3 and 4, the apparatus for the ultrasonic inspection of the FML structure 500 comprises a transmitter 560 for transmitting a first ultrasonic beam 561 along a first ultrasonic beam guiding medium 565 to the FML structure 500 and a receiver 580 for receiving a second ultrasonic beam 581 originating from the first ultrasonic beam 561 after passing through the FML structure 500.

The first ultrasonic beam 561 has a first axis 566 non-perpendicular to the first surface 520 under a first angle 562 with respect to a first normal 563 of the first surface 520 of the FML structure 500.

The second ultrasonic beam 581 along a second guiding medium 585 has a second axis 586 under a second angle 582 with respect to a second normal 583 of the first surface 520 of the FML structure 500, wherein the second normal 583 is opposite to the first normal 563.

The ultrasonic beam guiding medium may be water. The first beam 565 and the second beam 585 may be the same guiding medium or two different guiding media.

According to an embodiment of the present disclosure, the ultrasonic beam guiding media 565, 585 are a fluid which may be water. The first guiding medium 565 and the second guiding medium 585 may be the same guiding medium or two different guiding media.

According to an embodiment of the present disclosure, the apparatus further comprises a first nozzle 564 that generates a first water jet as the first ultrasonic beam guiding medium 565 guiding the first ultrasonic beam 561 under the first angle 562 with respect to the first normal 563. In other words, the first ultrasonic beam 561 is guided into the FML structure 500 by means of the first water jet 565 squirting towards the first surface 520 of the FML structure 500. The apparatus comprises a second nozzle 584 that generates a second water jet as the second ultrasonic beam guiding medium 585 guiding the second ultrasonic beam 581 under the second angle 582 with respect to the second normal 583. The transmitter 560 and the receiver 580 can be an ultrasonic transducer.

According to an embodiment of the present disclosure, the first angle 562 may not be equal to the second angle 582. The first axis 566 is not in line with the second axis 586. According to an embodiment of the present disclosure, the second angle 582 may also be defined as the angle with respect to a normal of a second surface 591 of the FML structure 500 opposite to the first surface 520.

According to an embodiment of the present disclosure, the first angle 562 is set to be between 20 degrees and 70 degrees. According to an embodiment of the present disclosure, the second angle 582 is set to be between +30 degrees and −30 degrees.

Despite the first angle 562 not being equal to the second angle 582, and the first axis 566 not being in line with the second axis 586, the first ultrasonic beam 561 still pass through the FML structure 500 and the corresponding second ultrasonic beam 581 is guided through the second water jet 585 to the receiver 580. This is due to the interaction of several ultrasonic wave types within the FML structure 500 and the stringer 510, which are not disclosed further.

According to an embodiment of the present disclosure, the first angle 562 is set in such a way that the first axis 566 of the first beam 565 crosses a first area 521 where the stringer 510 is attached to the first surface 520 of the FML structure 500, According to an embodiment of the present disclosure, the first axis 566 of the first beam 565 is set to cross an area 535 in which the web plate 540 is attached to the stringer foot 530. This configuration may enable the detection of defects in the vicinity of the area 535 that are difficult to be detected using the conventional technique described in the corresponding text of FIG. 2.

According to an embodiment of the present invention, instead of using nozzles, the setup can also be immersed in an ultrasonic beam guiding medium that can be water.

The defects can be planar defects. In particular the defects can be planar defects in a skin 520 or in a bond under the web plate 540. Defects can refer to a circular defect with a diameter of approximately 6 mm, or to a longitudinal defect of 4 mm wide. The stringer 510 may have a cross-sectional profile comprising one of the shapes: C, I, L, Z, Ω.

The embodiment according to FIG. 3 are suitable for detecting defects under a stringer hat. The embodiment according to FIG. 4 are suitable for defects under a stringer web. The embodiment according to FIG. 5 are suitable for defects directly under a stringer web. The embodiment according to FIGS. 1-4 relate to defects 280, 394, 494 in an area 299, 395, 396, 499 for which the transducers need to manipulate or move over this area (i.e. C-scan inspection). The embodiment according to FIG. 5 can be applied for making a line scan such that the defect 594 under the stringer web 599 is detected even if the transducers only move along a line parallel to the stringer length only, although this set-up is even more effective when scanning the area.

Figure 1:
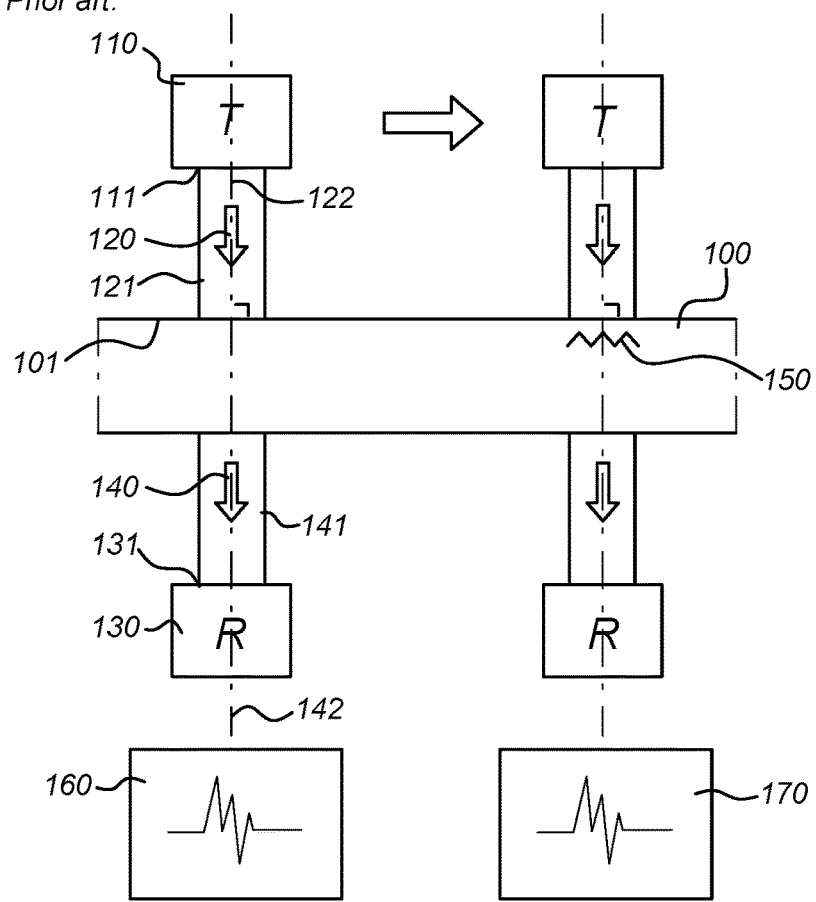
FIG. 1 schematically shows a side view of a FML structure that is inspected by an apparatus according to prior art.
Figure 2:
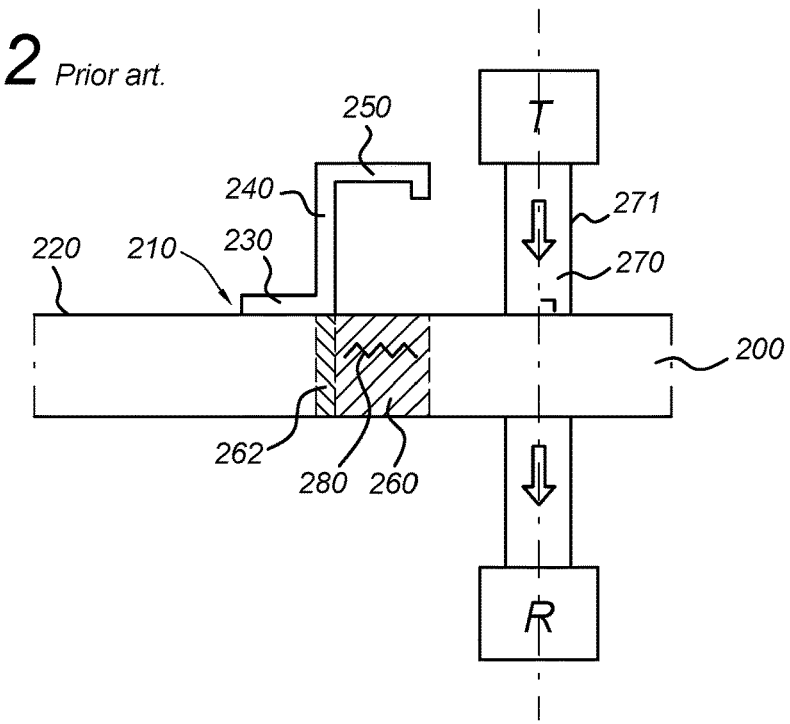
FIG. 2 schematically shows a side view of a FML structure that is inspected by an apparatus according to prior art.

According to an embodiment of the present disclosure, the ultrasonic through-transmission set-up may have a fluid coupling medium (e.g. water), the FML structure either being fully immersed in a fluid tank, being locally immersed applying local baths of fluid between the transducers and the FML structure to be inspected or applying a fluid jet set-up (see FIG. 2). Furthermore, according to an embodiment of the present disclosure, the disclosure relates to (semi)-automatic (C-scan) systems and manually inspection set-ups and the use of either flat or focused transducers.

The present invention has been described in relation to multi-layered structures such as FML structures. The skilled in the art will understand that such multi-layered structures additionally comprise bonded metal-sheet-sheet structures.

The apparatus of the present invention is configured for setting the transmission angle of the first axis of the first ultrasonic beam to a value such that the second axis passes through a location beneath the stiffener beneath the first surface to which said stiffener is attached. The second axis can be an axis of the transmitted ultrasonic beam or refracted ultrasonic beam. The stiffener can comprise a stringer 312, 410, 510. The location can be a location beneath the stringer foot 330, 340, 530 or beneath the web plate 340, 440, 540 in the ML structure.

In the foregoing description of the Figures, the invention has been described with reference to specific embodiments thereof. It will, however, be evident that various modifications and changes may be made thereto without departing from the scope of the invention as summarized in the attached claims.

In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. An apparatus for ultrasonic inspection of a multi-layered (ML) plate structure that includes a stiffener with a foot attached on a first surface of the ML plate structure, the apparatus comprising:
a transmitter arranged to direct a first ultrasonic beam (561) along a first ultrasonic beam guiding medium (565) to the ML plate structure, along a first axis which is at an angle to the first surface, said first axis being within a defined transmission angle (562) with respect to a first normal (563) which is perpendicular to the first surface of the ML plate structure; and
a receiver for receiving a transmitted ultrasonic beam (581) originating from the first ultrasonic beam after passing through the ML plate structure along a second axis (586) of a second ultrasonic beam guiding medium (585) for directing the transmitted ultrasonic beam,
the apparatus being configured for setting the transmission angle of the first axis of the first ultrasonic beam to a value such that the second axis passes through a location beneath the stiffener below the first surface to which said stiffener is attached,
and the apparatus being further configured for setting the second axis under a reception angle (582) within an angular range around a central orientation perpendicular (583) to a second surface of the ML plate structure opposite to the first surface.

2. The apparatus according to claim 1, further comprising:
means for varying the reception angle of the second axis;
means for measuring a signal quality from the transmitted ultrasonic beam received by the ultrasonic receiver; and
means for determining and setting the reception angle where in the angular range the signal quality is comparatively enhanced.

3. The apparatus according to claim 1, wherein the first ultrasonic beam guiding medium comprises water.

4. The apparatus according to claim 1, further comprising:
a first nozzle (564) for generating a first water jet as the first ultrasonic beam guiding medium (565) guiding the first ultrasonic beam (561) under the transmission angle with respect to the first normal; and
a second nozzle (584) for generating a second water jet as the transmitted ultrasonic beam guiding medium (585) guiding the transmitted ultrasonic beam (581) under the reception angle with respect to the second normal.

5. The apparatus according to claim 1, wherein the transmission angle is equal to the reception angle and the first axis being in line with the second axis.

6. The apparatus according to claim 1, wherein the transmission angle is not equal to the reception angle.

7. The apparatus according to claim 1, wherein the transmission angle is between 20 degrees and 70 degrees.

8. The apparatus according to claim 1, wherein the reception angle is between −30 degrees and 30 degrees.

9. The apparatus according to claim 1, wherein the ML plate structure is selected from the group consisting of Fibre Metal Laminate structure and bonded metal sheet-sheet structure.

10. The apparatus according to claim 1, wherein the stiffener element is one selected from the group consisting of a stringer element and a beam element.

11. A method for ultrasonic inspection of a multi-layered (ML) plate structure that includes a stiffener with a foot attached to a first surface of the ML plate structure, the method comprising:
providing an ultrasonic beam from a transmitter;
directing the ultrasonic beam along a first axis of first ultrasonic beam guiding medium guiding the first ultrasonic beam at the foot under a transmission angle;
transmitting the ultrasonic beam through the foot and the ML plate structure to a second surface of the ML plate structure parallel to the first surface, wherein the transmission angle of the ultrasonic beam is set to a value such that the ultrasonic beam runs along a second axis that passes through a location beneath the stiffener below the first surface to which said stiffener is attached;

receiving the transmitted ultrasonic beam, transmitted through the foot and the ML plate structure and propagating from the second surface along the second axis (586) of the second ultrasonic beam guiding medium (585), by an ultrasonic receiver under a reception angle, with the reception angle within the angular range around the central orientation that is perpendicular to the second surface;

scanning the angular range by varying the reception angle of the ultrasonic receiver within the angular range and during scanning;

measuring a signal quality from the transmitted ultrasonic beam received by the ultrasonic receiver; and setting the receiver at the reception angle where in the angular range the measured signal quality is comparatively enhanced.

12. The method according to claim 11, wherein the first ultrasonic guiding medium comprises water.

13. The method according to claim 11, further comprising:

generating a first water jet as the first ultrasonic beam guiding medium under the transmission angle with respect to the first normal; and generating a second water jet as the second ultrasonic beam guiding medium for guiding the transmitted ultrasonic beam along the second axis under the reception angle with respect to the second normal.

14. The method according to claim 11, further comprising:

setting the transmission angle being equal to the reception angle and the first axis being in line with the second axis.

15. The method according to claim 11, further comprising:

setting the transmission angle not being equal to the reception angle.

16. The method according to claim 11, further comprising:

setting the transmission angle between 20 degrees and 70 degrees.

17. The method according to claim 11, further comprising:

setting the reception angle between −30 degrees and 30 degrees.

18. The method according to claim 11, wherein the stiffener is one selected from the group consisting of a stringer element and a beam element.

19. The method according to claim 18, wherein the stringer element or beam element has a cross-sectional profile comprising one of the shapes: C, I, L, Z, Ω.

* * * * *